United States Patent
Faust

[15] 3,670,176
[45] June 13, 1972

[54] SWITCHING ARRANGEMENT FOR DISCONNECTING HIGH VOLTAGE DIRECT CURRENT LINES

[72] Inventor: Werner Faust, Zentralstrasse 101, 5430 Wettingen, Switzerland

[22] Filed: April 5, 1971

[21] Appl. No.: 131,143

[30] Foreign Application Priority Data

April 10, 1971 Switzerland ..........................5325/70

[52] U.S. Cl. ............................................307/136, 317/11 C
[51] Int. Cl. .......................................................H01h 33/16
[58] Field of Search ...........307/136; 200/144 AP; 317/11 A, 317/11 C

[56] References Cited

UNITED STATES PATENTS

| | | | |
|---|---|---|---|
| 3,611,031 | 10/1971 | Lutz | 307/136 X |
| 3,534,226 | 10/1970 | Lian | 307/136 X |
| 3,448,287 | 6/1969 | Giammona | 307/136 |
| 3,192,440 | 6/1965 | Baltensperger | 200/144 AP X |

FOREIGN PATENTS OR APPLICATIONS 1,490,434  7/1969  Germany ..............................307/136

Primary Examiner—Robert K. Schaefer
Assistant Examiner—William J. Smith
Attorney—Pierce, Scheffler & Parker

[57] ABSTRACT

A switching arrangement for disconnecting a high voltage direct current line and commutating the line current includes a first isolator switch arranged in parallel to the commutating system and a second isolator switch arranged in series with this parallel circuit which latter is connected across the high voltage line through the second isolator switch. The commutating system includes two variable resistance branches connectible in parallel with the first isolator switch for commutating the load current, each such branch includes a controllable electric valve in series with the variable resistance, the valves are rendered conductive in alternation so that the resistance branches are likewise connected in alternation in parallel with the first isolator switch, and the values of the resistances in the respective branches are increased in steps in the time intervals during which they do not carry current. Disconnection of the line is initiated by opening the first isolator switch thus to commutate the load current to the two paralleled resistance branches, the load current is progressively reduced as a result of the stepped increases in resistance values, and lastly the second isolator switch is opened thus to complete the line disconnection.

6 Claims, 3 Drawing Figures

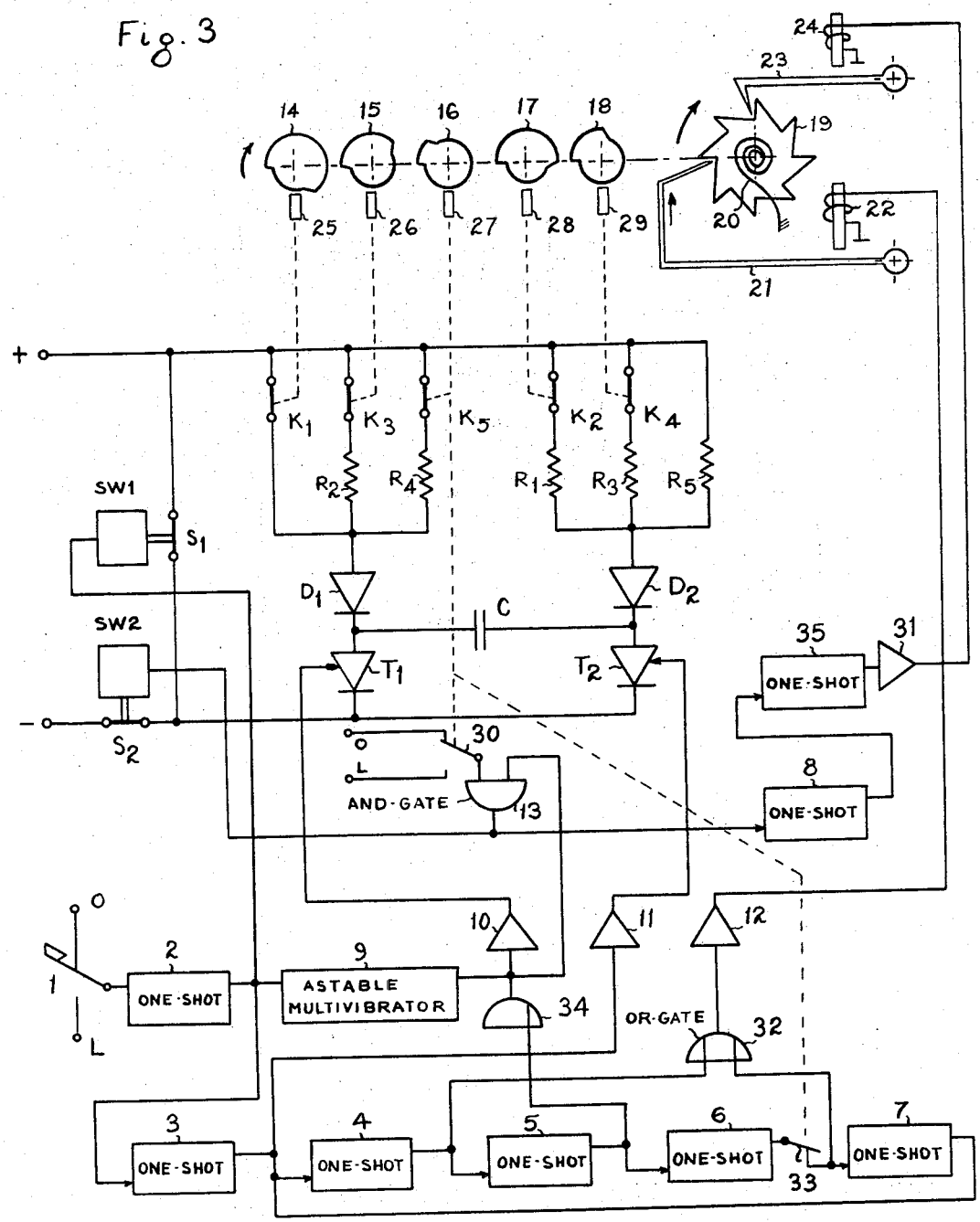

SWITCHING ARRANGEMENT FOR DISCONNECTING HIGH VOLTAGE DIRECT CURRENT LINES

The invention relates to switching means for disconnecting high-voltage direct current lines by means of a commutating system, disposed serially to an isolator and in parallel to a further isolator.

The prior art discloses systems in which the commutating means comprise the serial connection of non-inductive resistors, an electric valve, which must be controllable, being connected in parallel to each resistor. If the valves of the known systems are driven to cut-off in steps, the parallel-connected resistors will become effective and thus reduce the current. The purpose of such systems is to convert into thermal energy the magnetic energy which is present in the circuit of high-voltage DC lines at the beginning of the disconnecting phase and for such energy to be dissipated.

Known switching means however suffer from the disadvantage that at least one controllable electric valve must be associated with each non-inductive resistor.

If the abruptness of the disconnecting operation is not to be excessive, it will be necessary for a correspondingly large number of switching steps to be provided. In addition to calling for the associated controllable electric valve, such a system also requires a large number of commutating capacitors and, in appropriate cases, commutating inductances.

The principal object of the present invention is, therefore, to provide an improved means for disconnecting high-voltage DC lines which avoids the disadvantages of known systems.

According to the invention, the problem described above is solved by means serving for the alternate connection of two resistance branches of the commutating means, connected in parallel to the isolator and means being furthermore provided for a stepped increase of the resistance value of the resistor branches during the time intervals in which they do not carry current.

It is a particular advantage of the invention, by contrast to apparatus associated with the prior art, that it requires a substantially smaller number of controllable electric valves and that only a single commutating capacitor is required.

A further notable advantage of the apparatus according to the invention may be seen in the fact that it is possible by simple means for the disconnecting procedure to be optimized relative the DC high-voltage network by the appropriate selection of the number of steps in the resistor branches and the grading between said steps. This does not require any modification of the basic circuit and for this reason such adaptation may also be performed subsequently in practical operation.

According to one preferred embodiment, the means for the alternate connection of the resistor branches comprise non-controllable electric valves adapted to co-operate with controllable electric valves and one commutating capacitor.

According to a further embodiment, the means for effecting the stepped increase of the resistance value of the resistor branches may comprise mechanical isolators each of which is connected in series with ohmic resistors, the parallel connection of which forms the resistor branches.

It is particularly advantageous for a commutating inductance to be disposed in series with the commutating capacitor since this procedure limits the rate-of-change of current rise $di/dt$ which accompanies the capacitor discharge.

It is further advantageous for another commutating inductance to be disposed in series with the controllable electric valves of the first serial connection since this will limit the rate-of-change of current rise when the full load current is taken over by the commutating means.

Suitable embodiments of the invention are illustrated in the accompanying drawings in which:

FIG. 3 is a schematic illustration of one suitable circuit for controlling the switching mode.

Identical parts in the illustration are provided with the same reference symbols having the following significance: $L_o$ the line inductance, $R_o$ the active resistance of the line, $S_1$ and $S_2$ isolators, $E_=$ the DC voltage, $W_1$ and $W_2$ resistor branches comprising the ohmic resistors $R_1$ to $R_n$ and the circuit isolator elements $K_1$ to $K_n$, $T_1$ and $T_2$ controllable electric valves, $D_1$ and $D_2$ non-controllable electric valves, $C$ a commutating capacitor, $L_{K1}$ and $L_{K2}$ being commutating inductances.

Figure 1:
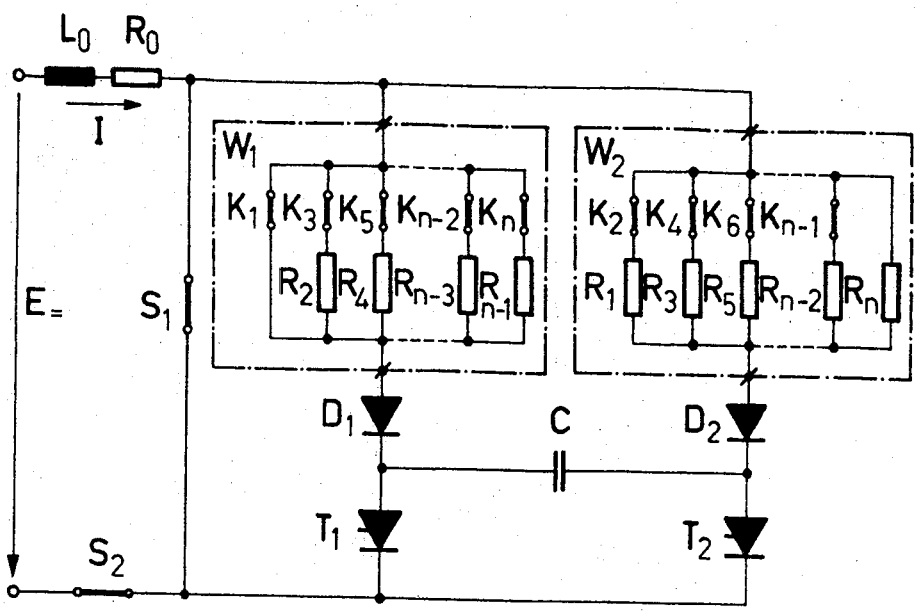
FIG. 1 shows a high voltage DC circuit according to the invention.

The method of operation of the system according to the invention may be explained by reference to FIG. 1 in which the circuit elements $K_1$ to $K_n$ are numbered in accordance with their switching sequence in order to facilitate a better understanding of the system.

When the high-voltage DC line is connected through, the isolators $S_1$ and $S_2$ will be closed and the commutating system will be at operational stand-by. This means, all circuit elements $K_1$ to $K_n$ will be in their conductive state (illustrated position in FIG. 1), the controllable electric valves $T_1$ and $T_2$ will be driven to cut off, and the commutating capacitor $C$ will be charged so that a positive charge will be carried by the capacitor side connected to the junction between the cathode of the valve $D_2$ and the anode of the controllable valve $T_2$. The capacitor $C$ shall have received the aforementioned charge at the end of the preceding disconnecting cycle as will be described hereinbelow.

No charging means for the commutating capacitor $C$ is required during operation of the disconnecting means since the particular circuit layout ensures that the commutating capacitor $C$ is charged at the required polarity by the load current $I$.

When the isolator $S_1$ begins to open, a control system, not shown, fires the controllable electric valve $T_1$, so that as a result of the diminishing contact pressure and the correspondingly rising voltage drop across the isolator $S_1$, the load current $I$ commutates from said isolator to the serial connection of the resistor branch $W_1$ of the electric valve $D_1$ and of the controllable electric valve $T_1$. Since the circuit element $K_1$ conducts current, the entire load current $I$ can pass without reduction through the commutating means to enable the isolator switch $S_1$ to be opened without an arc being struck.

This is followed by striking of the controllable electric valve $T_2$. The commutating capacitor $C$ may then be discharged through the said valve $T_2$ and the conductive, controllable electric valve $T_1$, thus driving the controllable valve $T_1$ to cut off.

Owing to the presence of the electric valves $D_1$ and $D_2$, the commutating capacitor $C$ can discharge only through the controllable electric valves $T_1$ and $T_2$.

The load current $I$ will then flow briefly through the current carrying circuit element $K_1$, the electric valve $D_1$, the commutating capacitor $C$, the controllable valve $T_2$ and then through the current carrying isolator switch $S_2$. Accordingly, the commutating capacitor $C$ will be charged with the reverse polarity and, in accordance with its state of charge, will gradually interrupt this circuit. Accordingly, and to an increasing extent, the resistor branch $W_2$ will carry the load current $I$ which drops to a new value in accordance with the time constant $L_o$: $(R_o + W_2)$ of the circuit, $W_2$ representing the effective resistance of the parallel connection of all resistors $R_1, R_3 \ldots R_5 \ldots R_n$, connected in the circuit.

The circuit element $K_1$ of the resistor branch $W_1$, which is dead during this time, is moved into its current flow blocking position so that the effective resistance of this branch corresponds to the parallel connection of $R_2, R_4 - R_{n-1}$.

The controllable valve $T_1$ is struck for the second time immediately before the load current $I$ reaches its new value.

The commutating capacitor $C$ is thereupon discharged through the said controllable valve $T_1$ and the controllable valve $T_2$ which is thus driven to cut off.

The load current $I$, already reduced, is briefly distributed over the two resistor branches $W_1$ and $W_2$, the current proportion flowing through the branch $W_2$ recharging the commutating capacitor $C$ to its original polarity and being then interrupted by said capacitor.

The circuit element $K_2$ may thus also be switched when it is not carrying current.

The resistor branches $W_1$ and $W_2$ are thus controlled by the controllable electric valves $T_1$ and $T_2$ to alternately carry the load current I in the manner described hereinbefore, the resistance value of the branches being increased in steps during the periods of time when said branches do not carry current namely by virtue of the circuit elements $K_1$ to $K_n$ being blocked in the sequence in which they are numbered.

Finally, the controllable electric valve $T_1$ is struck. Since all circuit elements $K_1$ to $K_n$ are in the current blocking state, it follows that the load current I, already substantially reduced, must flow through the non-inductive resistor $R_n$ in the branch $W_2$, through the electric valve $D_1$, through the commutating capacitor C, through the controllable valve $T_1$ and through the isolator switch $S_2$. No current can flow through the commutating means once the commutating capacitor C is charged, namely at its initial polarity, so that the isolator switch $S_2$ may then also open without striking an arc.

The said isolator switch $S_2$ will then carry the restriking voltage and the high-voltage line is thus interrupted.

The commutating means are reset into their stand-by state by means of the control system not shown, that is to say all circuit elements $K_1$ to $K_n$ are in the conductive state and the controllable valves $T_1$ and $T_2$ are driven to cut off.

The last load current pulse charges the commutating capacitor C with the correct polarity which is retained until the next interrupting cycle. If necessary (if the switching intervals are excessive) it is possible for this state of charge of the aforementioned capacitor to be maintained by a small charging apparatus, connected only during switching intervals.

Figure 2:
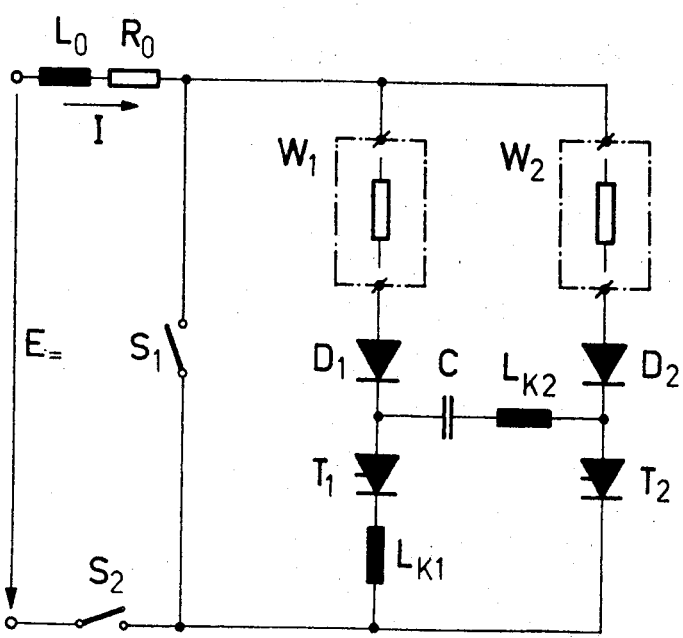
FIG. 2 shows a modification for the circuit according to FIG. 1.

If, as shown in FIG. 2, commutating inductances $L_{K1}$ or $L_{K2}$ are appropriately disposed in series with the commutating capacitor C and/or in series with the controllable electric valve $T_1$, the rate of change of current rise $di/dt$ through the valves is limited thus preventing overstressing of said rectifiers. This is particularly important if controllable valves of the semi-conductor type, so-called thyristors, are advantageously employed as the controllable valves $T_1$ and $T_2$.

Mechanical isolators $S_1$ and $S_2$ as well as mechanical switches $K_1$ to $K_n$ are provided in the drawing but other elements for conducting or interrupting current flow may also be provided in their place.

One suitable arrangement for controlling the switching mode of the switching arrangement is illustrated in FIG. 3. This arrangement is seen to include an actuating device SW1 for the circuit breaker $S_1$ depicted in FIGS. 1 and 2, a similar actuating device SW2 for circuit breaker S2.

Further included are a switch 1, actuable between two terminals to provide either an O-signal or an L-signal as a static input for a "flip-flop" 2, also known as a "one-shot," an arrangement of other one-shots 3, 4, 5, 6 and 7 with dynamic inputs cascaded to the output from one-shot 2, and an astable multivibrator 9 having an input connected intermediate the output from 2 and the input to 3. An amplifier 10 has its input connected to the output from multivibrator 9 and the output from an OR-gate 34 and to one input of an AND-gate 13, and its output connected to the ignition electrode terminal of the controllable electric valve $T_1$. The output from one-shot 3 is, on the one hand, coupled over an amplifier 11 to the ignition electrode terminal of the controllable electric valve $T_2$, and on the other hand, connected with the output of one-shot 7. The outputs of the one-shots 4 and 6 are each connected with one input of an OR-gate 32 respectively, and the output from OR-gate 32 actuates over an amplifier 12 an electromagnet 22. The input of OR-gate 34 and the output of one-shot 5 are connected together. A switch 33, which is mechanically coupled together with another switch 30 and the circuit isolator K5 (that means the last circuit isolator $K_n$ to be opened), is located at the output of one-shot 6. The switch 30 is actuable between two terminals to provide either an O-signal or an L-signal as an second input for the AND-gate 13. The output from AND-gate 13 is connected to and provides a triggering pulse for the actuating mechanism SW2 and is further connected to the dynamic input of a one-shot 8. A further one-shot 35 is in series connection with one-shot 8 and is followed by an amplifier 31. The output signal of the amplifier 31 actuates an electromagnet 24. The aforementioned OR-gates 32 and 34 serve only as decoupling networks. Cammed discs 14, 15, 16, 17 and 18 are mounted on a common shaft with a ratchet disk 19, which is combined with a pawl operating rod 21 and a locking pawl 23. The pawl operating rod 21 is actuated by the electromagnet 22 and the locking pawl 23 may be lifted by the electromagnet 24. A return spring 20 serves then to turn the ratchet disk 19 back into the stand-by position (shown in the drawing). With the elements 25, 26, 27, 28 and 29 are indicated schematically the respective actuating mechanism for the mechanical isolators $K_1 \ldots$ to $K_5$.

In order to initiate a switching-out procedure, the switch 1 is actuated briefly from the position shown in FIG. 3 from "O" terminal position to the "L" terminal position. This serves to apply an L-signal to the input of one-shot 2 which produces an output therefrom. The L-signal output from 2 sets into operation, on the one hand, the drive $SW_1$ for circuit breaker $S_1$ and which commences to open; on the other hand, it applies an input to the astable multivibrator 9 which then starts to run and produce an output consisting of a series of short pulses which are amplified in amplifier unit 10 and applied to the ignition electrode of $T_1$.

When circuit breaker $S_1$ begins to open, the voltage rises across the series circuit arrangement of electric valve $D_1$ and controllable valve $T_1$, and $T_1$ will then be rendered conductive by the ignition pulses. Commutation of the load current to the then conducting branch thus permits circuit breaker $S_1$ to open in arc-free manner.

After the one-shot 2 trips back to its rest position, the astable multivibrator 9 is cut off. The time characteristic of 2 therefore must be a little greater than the time span which is required for a complete opening of circuit breaker $S_1$.

As soon as one-shot 2 trips back to its rest position, one-shot 3 is set by means of the flank of the LO-transition. That is, its output goes from O to L. The output from 3 is applied to one-shot 4 and amplifier 11. The amplifier 11 then drives the controllable valve $T_2$ to its conductive state.

Before $T_1$ will be rendered conductive again, it is necessary to open the mechanical isolator $K_1$. For this reason, the change in the output on 3 from L to O sets the one-shot 4 and the L-signal on its output amplified by the amplifier 12 actuates the electromagnet 22. Therefore the electromagnet 22 attracts the pawl operating rod 21 and the ratchet disk 19 moves one step clockwise. In this position the cam disk 14 comes into operation with the actuating mechanism 25 (mechanical coupling) for the mechanical isolator $K_1$.

After one-shot 4 trips back to its rest position, the one-shot 5 is set and over OR-gate 34 and amplifier 10 the controllable valve $T_1$ is fired again. The next change from 5 to 6 actuates again the electromagnet 22 and cam disk 17 comes into operation with mechanism 28; therefore the mechanical isolator $K_2$ is opened.

When one-shot 7 is set by way of LO-transition on the output of 6, the before described operation starts again with ignition of the controllable valve $T_2$.

The cammed disks 14, 15, 16, 17 and 18 are formed to serve for opening the isolators $K_1$ to $K_5$ in the proper sequence.

At the same time with $K_5$ is the switch 30 actuated. As it can be seen, an L-signal is then applied to the second input of the AND-gate 13.

When subsequently one-shot 5 is set, the AND-condition is fulfilled. Then the L-signal output from 13 sets into operation, on the one hand, the drive SW2 for circuit breaker $S_2$ and which commences to open; on the other hand, it applies an input to the one-shot 8.

As soon as one-shot 5 trips back the AND-condition is not fulfilled and the signal on the input of one-shot 8 changes from L to O, thereby setting the one-shot 8.

In time with one-shot 8 also one-shot 6 is set. To prevent the circuit from running on and on, the switch 33 must be opened till one-shot 6 trips back into its rest position (thereby without setting oneeshot 7). One shot 35 serves this purpose, which acts as a delay-line because it is set after one-shot 6 has tripped back.

With the setting of one-shot 35, the L-signal on its output becomes amplified and actuates the electromagnet 24, so that the return spring 20 can turn the ratchet disk 19 and therefore all cammed disks back into the stand-by position.

This completes one cycle of the disconnecting process and the one-shots will now have all been reset to their rest position ready for initation of another disconnecting procedure.

I claim:

1. In a switching arrangement for disconnecting a high voltage direct current line and commutating the load current, the combination comprising a first isolator switch and a commutating system connected in a parallel circuit, a second isolator switch connected in series with said parallel circuit, said parallel circuit being connected across said high voltage line through said second isolator switch, said commutating system including two variable resistance branches, means for connecting one of said resistance branches in parallel with said first isolator switch while the other resistance branch remains disconnected, and vice versa whereby the load current flows first through one of said branches and then the other, and means for effecting stepped increases in the values of the resistances in said branches in the time intervals during which they are disconnected.

2. A switching arrangement as defined in claim 1 for disconnecting a high voltage direct current line wherein each said resistance branch is comprised of a variable resistance means, a non-controllable electric valve and a controllable electric valve connected in series, and a commutating capacitor connected between the cathode sides of the non-controllable electric valves.

3. A switching arrangement as defined in claim 2 for disconnecting a high voltage direct current line and which further includes a commutating inductance connected in series with said commutating capacitor.

4. A switching arrangement as defined in claim 2 for disconnecting a high voltage direct current line and which further includes a commutating inductance connected in series in one of said resistance branches.

5. A switching arrangement as defined in claim 2 for disconnecting a high voltage direct current line and which further includes a commutating inductance connected in series with said commutating capacitor and another commutating inductance connected in series in one of said resistance branches.

6. A switching arrangement as defined in claim 2 for disconnecting a high voltage direct current line wherein each of said resistance branches is constituted by a parallel circuit of ohmic resistors each of which is connected in series with a switching device to enable said resistors to be disconnected in sequence, and a further switching device which bridges said parallel circuit.

* * * * *

UNITED STATES PATENT OFFICE
CERTIFICATE OF CORRECTION

Patent No. 3,670,176     Dated June 13, 1972

Inventor(s)   Werner Faust

It is certified that error appears in the above-identified patent and that said Letters Patent are hereby corrected as shown below:

In the heading of the patent the identity of the assignee, to wit: AKTIENGESELLSCHAFT BROWN, BOVERI & CIE., BADEN, SWITZERLAND should appear.

Signed and sealed this 28th day of November 1972.

(SEAL)
Attest:

EDWARD M. FLETCHER, JR.  
Attesting Officer

ROBERT GOTTSCHALK  
Commissioner of Patents